United States Patent [19]

Despres et al.

[11] Patent Number: 5,366,057
[45] Date of Patent: Nov. 22, 1994

[54] CLUTCH FRICTION WHEEL FOR AN INDUSTRIAL VEHICLE

[75] Inventors: Dominique Despres, Amiens, France; Thomas Grabis, Kirchardt, Germany

[73] Assignee: Valeo, Paris, France

[21] Appl. No.: 36,854

[22] Filed: Mar. 25, 1993

[30] Foreign Application Priority Data

Mar. 26, 1992 [FR] France .................. 92 03638

[51] Int. Cl.⁵ ............................... F16D 3/14
[52] U.S. Cl. .................. 192/106.2; 192/70.17; 192/70.2; 464/68
[58] Field of Search ............... 192/106.2, 70.17, 70.2, 192/70.19; 464/63, 68

[56] References Cited

U.S. PATENT DOCUMENTS

| | | | |
|---|---|---|---|
| 3,129,570 | 6/1960 | Ludwig | 64/23 |
| 3,203,205 | 8/1965 | Giebel et al. | 64/27 |
| 3,414,101 | 12/1968 | Binder et al. | 192/106.2 |
| 3,428,155 | 2/1969 | Binder et al. | 192/106.1 |
| 4,471,863 | 9/1984 | Lech, Jr. | 192/70.17 X |
| 4,596,324 | 6/1986 | Braun | 192/106.2 |
| 4,606,451 | 8/1986 | Martinez-Corral et al. | 192/106.2 |
| 4,688,666 | 8/1987 | Blond | 192/106.2 |
| 4,903,812 | 2/1990 | Fisher et al. | 192/106.2 |
| 5,000,304 | 3/1991 | Köck et al. | 192/70.17 X |
| 5,240,458 | 8/1993 | Linglain et al. | 192/106.2 X |

FOREIGN PATENT DOCUMENTS

| | | |
|---|---|---|
| 0320955 | 6/1989 | European Pat. Off. . |
| 0328381 | 8/1989 | European Pat. Off. . |
| 1290070 | 2/1962 | France . |
| 1492280 | 7/1967 | France . |
| 1504222 | 12/1967 | France . |
| 2305637 | 10/1976 | France . |
| 1952620 | 6/1971 | Germany . |
| 3542491 | 6/1987 | Germany . |
| 3942610 | 9/1990 | Germany . |
| 1167749 | 10/1969 | United Kingdom . |
| 1541213 | 2/1979 | United Kingdom . |
| 2183790 | 6/1987 | United Kingdom . |
| 172244 | 3/1992 | U.S.S.R. . |
| 1720501 | 3/1992 | U.S.S.R. . |

*Primary Examiner*—Andrea L. Pitts
*Attorney, Agent, or Firm*—Longacre & White

[57] ABSTRACT

A clutch friction wheel of the kind which is in three parts, especially applicable to industrial vehicles, comprises a friction disc fixed to a damper plate, and guide rings fixed to a support ring which is arranged between the damper plate and the hub. Firstly, the friction disc, damper plate, guide rings, support ring and damping device constitute a first sub-assembly in which the guide rings are secured directly to the support ring on their inner perimeter; secondly, a predamper device acting between the support ring and hub constitutes with the latter a second sub-assembly, in which the predamper device is arranged outside the guide rings on one side of the latter, while a retaining abutment element is disposed axially on the hub on the other side; and thirdly, a mating coupling is arranged between the predamper device and the support ring.

10 Claims, 1 Drawing Sheet

CLUTCH FRICTION WHEEL FOR AN INDUSTRIAL VEHICLE

FIELD OF THE INVENTION

This invention relates to clutch friction wheels of the kind which are in three parts, and which include a friction disc fixed to a damper plate which, within the limits set by abutment means, is mounted for relative rotation with respect to a support ring, the latter being itself mounted for rotation with respect to the hub within the limits defined by loose coupling means, the clutch friction wheel further comprising: two guide rings which are fixed to the support ring and which enclose the damper plate; a damping device which acts between the damper plate and the guide rings; and a predamper device which acts between the support ring and the hub.

BACKGROUND OF THE INVENTION

Such friction wheels are well adapted to the transmission of high torques, as for example is the case with industrial vehicles, due to a balanced transmission of the torque to the damping device and equal distribution of this torque between the guide rings.

The guide rings are commonly secured to the support ring by means of rivets passing through the latter: this arrangement is disclosed in United Kingdom published patent specification GB 2 183 787A, which in this respect repeats the arrangements disclosed in German Utility Model specification DE-U-1 840 718 and its corresponding U.S. Pat. No. 3,203,205. These rivets, the number of which is limited, and which concentrate stresses locally, constitute weak points of the assembly. In order to minimize this disadvantage, their length can only be reduced to the detriment of the axial length of the support ring, and therefore also of the axial length of the loose coupling means provided between the support ring and the hub.

This can then have the effect of limiting the magnitude of the torque which can be transmitted. In addition, the rivets occupy radial space, and this is again detrimental to the loose coupling means between the support ring and the hub, and therefore also to the transmissible torque.

Another disadvantage of the rivets is that they do not lend themselves to easy fitting of the predamper device.

It is also known, from the French published patent specification FR 2 570 147A and the corresponding U.S. Pat. No. 4,688,666, to provide an arrangement which does in fact facilitate such fitting, and in which the predamper device and the hub together constitute a sub-assembly. However, in this arrangement as disclosed in the said French patent specification 2 570 147, the friction disc is fixed to the guide rings despite the fact that the damper plate is fixed to the support ring, and the damping device is inserted axially between the damper plate and one of the guide rings. This makes the assembly difficult to dismantle.

Dismantling can be a requirement, for example in order to facilitate testing, or to minimize the extent of any possible operations during reconditioning or recycling.

DISCUSSION OF THE INVENTION

An object of the invention is to provide a clutch friction wheel which mitigates the drawbacks of the prior art arrangements, while preserving their advantages.

According to the invention, a clutch friction wheel, of the kind comprising: a friction disc fixed to a damper plate, which, within the limits defined by abutment means, is mounted for rotation relative to a support ring, the latter being itself mounted for rotation with respect to a hub within the limits defined by loose coupling means; two guide rings which are fixed to the support ring and enclose the damper plate; a damping device which acts between the damper plate and the guide rings; and a predamper device which acts between the support ring and the hub, is characterised in that, in combination: firstly, the friction disc and the damper plate, the guide rings, the support ring and the damping device together constitute a first sub-assembly, in which the guide rings are secured directly to the support ring on their inner perimeter; secondly, the predamper device and the hub together constitute a second sub-assembly, with the predamper device being disposed outside the guide rings, on a first side of the latter, with a retaining abutment element being disposed axially on the hub on the other side of the said guide rings; and thirdly, a mating coupling is provided between the predamper device and the support ring.

The guide rings may for example be welded to the support ring. In a modification they may be secured to the support ring by upsetting the material of the support ring and/or the guide rings. In either case, the guide rings are secured directly to the support ring, that is to say without any auxiliary fastening elements such as rivets or the like being used. Accordingly it becomes possible, where circumstances permit, to design the loose coupling means between the support ring and the hub so that its axial and/or radial size is as large as may be desired.

Similarly, the fitting of the predamper device, and any possible removal thereof, can be easily carried out due to the mating coupling.

In addition the predamper device can if desired be made of an increased radial dimension, and it may also be tested before being fitted.

The various features and advantages of the invention will appear more clearly from the description of preferred embodiments of the invention which follows, and which is given by way of example only and with reference to the accompanying drawings.

DESCRIPTION OF PREFERRED EMBODIMENTS OF THE INVENTION

Figure 1:
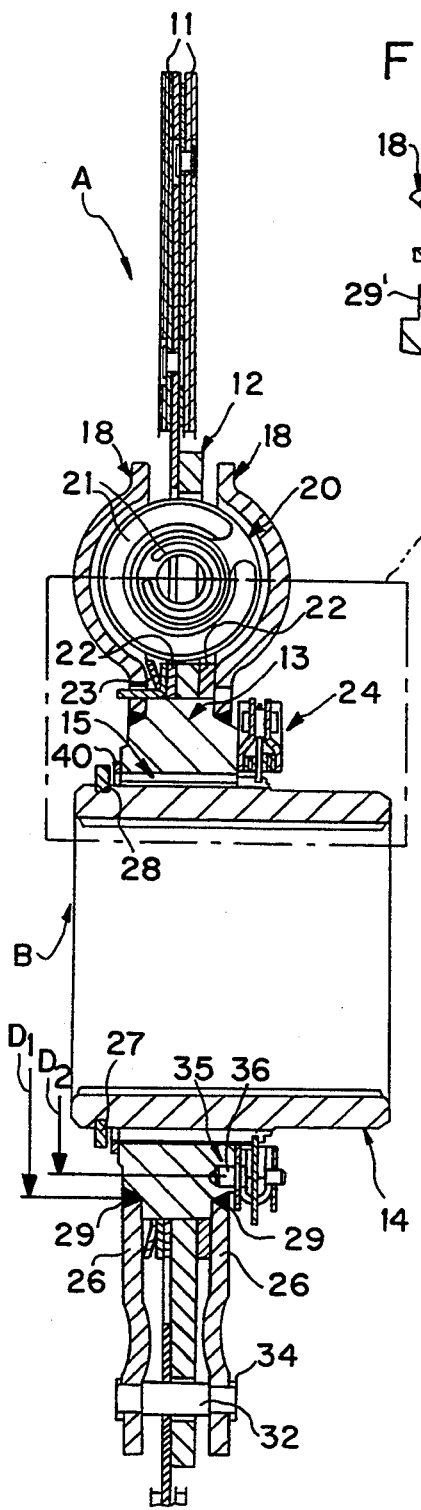
FIG. 1 is a view in axial cross section of part of a clutch friction wheel in accordance with the invention.

The clutch friction wheel shown in the drawings is part of a clutch which is intended in particular for industrial vehicles. It comprises a clutch disc 10 carrying friction liners 11, which are disposed on either side of the disc 10 at the outer periphery of the latter, being secured to it in this example by riveting. The disc 10 is secured at its inner periphery to a damper plate 12, in this example again by riveting. In this embodiment the friction disc 10 is extended radially along the whole radial height of the damper plate 12.

Within the limits imposed by abutment means which are described below, the damper plate is mounted for rotation with respect to a support ring 13, which is itself mounted for rotation with respect to a hub 14. This relative rotation between the support ring 13 and hub 14 is limited by a loose coupling means 15, comprising cooperating splines 16 on the internal surface of the support ring 13 and splines 17 on the outer surface of the hub 14.

Two guide rings 18, which are secured to the support ring 13, enclose the damper plate 12, while a damping device 20 is arranged between the guide rings 18 and the damper plate 12 so as to act between them. The damper 20 comprises springs 21 and friction rings 22. Finally, a predamper device 24 is arranged to act between the support ring 13 and the hub 14, by virtue of a rotary coupling 35 which will be described below.

The predamper device 24 in this example is the same as that which is described in the specification of French published patent application FR 2 570 147A, to which reference is invited for more details. It comprises a damper plate 12', through which it is attached on the hub 14 by crimping; it also includes two guide rings 18' enclosing its damper plate 12'.

Like the damping device 20, the predamper 24 also includes, between its damper plate 12' and guide rings 18', a pair of friction rings 22'. Each of these friction rings is arranged on a respective side of the damper plate 12', the friction rings being jointly biassed by a resilient ring 23', optionally through a spacing ring. The damper plate 12' is coupled circumferentially to the guide rings 18' by means of springs, which have a much lower stiffness than the springs 21 of the damper 20, their purpose being to damp out vibrations during the deceleration of the engine. All of these springs, which in this example are of the coil spring type, and/or of the type comprising blocks of resilient materials, are partly accommodated, without a clearance, in windows formed in the associated guide rings 18 or 18'; and partly in further windows which are formed in the associated damper plates 12 and 12'. A clearance may be provided between the springs and some of the windows in the damper plates.

The various components so far described are well known in themselves, and need not be described here in any further detail: the invention is concerned simply with the way in which they are arranged. However, it will be recalled that the predamper 24 and the damper 20 are mounted in series by means of the rotary coupling 35 mentioned above. In practice, the friction liners 11 are adapted to be gripped between the pressure plate and reaction plate (not shown) of the clutch, which are secured with respect to the crankshaft of the engine of the vehicle for rotation with it. Similarly, the hub 14 is adapted to be coupled, via its splined internal bore, to the input shaft of the gearbox. The propulsion torque is transmitted in this way from the liners 11 to the hub 4 through the damper 20 and the predamper 24. When this torque is small (in particular in the slow running mode of the engine), the springs of the predamper 24 are compressed, while in this mode there is no relative movement between the guide rings 18 and damper plate 12 of the main damper, due to the high stiffness of its springs 21. However, once the clearance in the loose coupling means 15 has been taken up, the support ring 13 becomes rotatable with the hub 14, so that the springs 21 then start to become compressed, the springs of the predamper 24 remaining solid. Frictional forces are of course set up by the friction rings 22 and 22' during the various relative movements between the guide rings 18, 18' and the associated damper plates 12, 12' against the action of these springs.

The friction disc 10 and the damper plate 12, in combination with the guide rings 18, support ring 13 and damping device 20, together constitute a first sub-assembly indicated in FIG. 1 at A. In this sub-assembly, the guide rings 18 are secured directly to the support ring 13 through their internal perimeter 26, without any rivets whatever. The predamper 24 and the hub 14 together constitute a second sub-assembly B, with the predamper 24 being disposed on the outside of the guide rings 18 and on one side of the latter, and a retaining abutment element 27 being located axially on the hub 14 on the other side of the guide rings 18. Thirdly, the rotary coupling 35, in the form of a mating coupling, is arranged between the predamper device 24 and the support ring 13.

In this example, the predamper device 24 is carried on the hub 14 at one of the ends of its splines 17, while beyond the other end of the latter the retaining abutment element 27 consists of a resilient split ring, which is fitted in a circumferential groove 28 formed on the hub 14.

Preferably (and as shown in the drawings), the guide rings 18 are secured to the support ring 13 by welding (for example by laser welding) as indicated at 29, between the surface portion 30 of their internal perimeter 26 and a surface 31 of the support ring 13. The internal perimeter 26 extends at right angles to the axis of the assembly, and in this example both the surface portion 30 and the surface 31 are chamfered.

Figure 4:
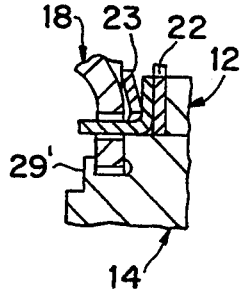
FIG. 4 is a view in axial cross section similar to FIG. 2 and showing part of the clutch friction wheel, in a modified embodiment of the invention.
Figure 2:
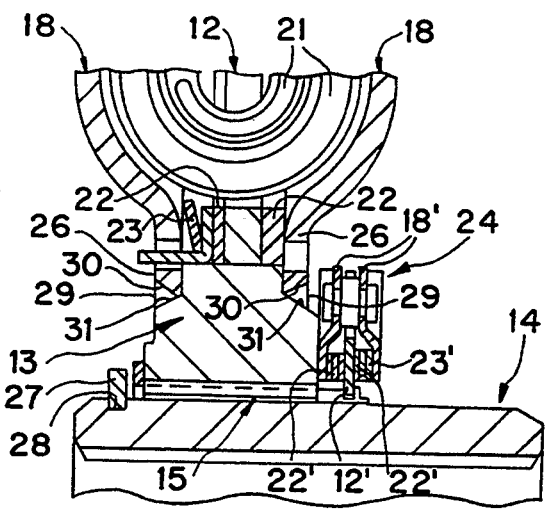
FIG. 2 repeats the detail indicated by the rectangle II in phantom lines in FIG. 1, but on a larger scale.
Figure 3:
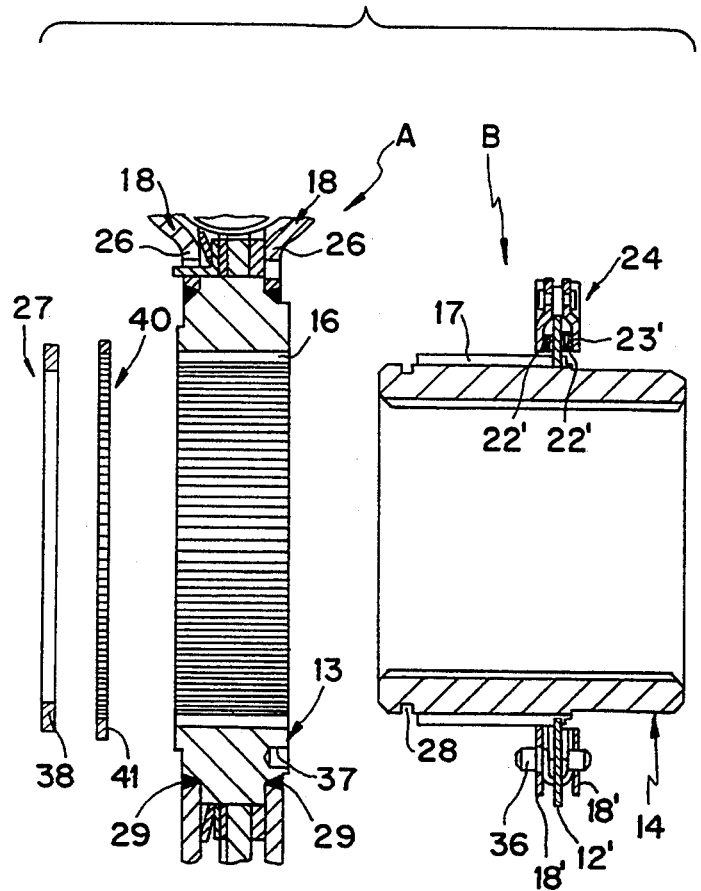
FIG. 3 is a view in exploded axial cross section, derived from part of FIG. 1 and showing how the clutch friction wheel according to the invention is mounted.

The weld 29 may for example be endless, though in a modification it may be in the form of spot welds. In all cases, the weld 29 has the advantage that it leads to minimum axial length, with the guide rings 18 remaining within the overall axial space defined by the support ring 13 at their foot. However, in a modification which is shown in FIG. 4, the guide rings 18 can if desired be secured to the support ring 13 by means of an upset flange 29'. This flange 29' may for example define a set of teeth (as shown), or a polygonal force fit, at the inner periphery of the guide rings 18.

The abutment means acting between the damper plate 12 and the guide rings 18 comprise at least one bar 32. In practice there are several of these bars 32, spaced apart circumferentially. They are carried without clearance by the guide rings 18, and extend parallel to the axis of the assembly, so as to pass without any clearance through the damper plate 12. As is indicated in broken lines at 34 in FIG. 1, at least one of these bars 32—and in practice each of them—is preferably upset over the associated guide rings 18, before the latter are secured to the support ring 13.

Thus, while the guide rings are being welded to the support ring, any tendency for the guide rings 18 to assume a conical shape is avoided. In addition, it is possible in this way to carry out the welding operation, separately from the assembly of the components together, prior to the upsetting operation. Finally, this has the further advantage of reinforcing the maintenance of the relative orientation between the guide rings 18 in operation.

In the present example, the predamper device 24 is abutted against the support ring 13, with the mating coupling 35 being arranged to act between the damper 24 and ring 13 so as to couple them in rotation. The mating rotary coupling 35 comprises at least one pin 36, and in practice a plurality of pins 36 spaced apart circumferentially. These pins are carried by the predamper device 24, and are parallel to the axis of the assembly. Each pin 36 is individually engaged in a respective one of a number of complementary axial recesses 37 which are provided for this purpose in the support ring 13. The pins 36 are accordingly inserted axially into the recesses 37, optionally with a circumferential clearance. The guide rings 18 are secured to the support ring 13 over a circumference having a diameter D1, which is greater than the diameter D2 of the circumference on which the rotary coupling 35 acts.

In this example, the resilient ring defining the retaining abutment element 27 is open radially in a slot 38. A spacing ring 40, which is mounted for rotation on the hub 14, and which is free to be displaced axially, is provided between the retaining ring 27 and the support ring 13, so as to prevent accidental opening of the slot 38 during the angular displacement between the support ring 13 and the hub 14. The spacing ring 40 may for example (and as shown) consist of a resilient ring, which is open in a slot 41 and which is in engagement with the splines 17 on the hub 14.

Each of the two sub-assemblies A and B may be assembled at a separate location. The sub-assembly B can then simply be engaged, through the hub 14, in the support ring 13 of the sub-assembly A, with the pins 36 of the predamper device 24 being inserted into the recesses 37 in the support ring 13. After the spacing ring 40 has been fitted in position, the resilient ring comprising the retaining abutment element 27 is then fitted on to the hub 14.

In practice, in order to accommodate any possible fitting tolerances, an axial clearance is left between the two sub-assemblies A and B after assembly.

As will have been understood from the foregoing description and from the drawings, the support ring 13 may be made to any desired axial length, while, circumstances permitting, its splines 16, together with the splines 17 on the hub 14, may be made more numerous than in the prior art arrangements; they may also be arranged over a larger diameter. In other words, the loose coupling means 15 which act between the support ring 13 and the hub 14 may be designed so as to have the desired radial and/or axial dimensions. In conjunction with this, the thickness of the hub 14 can be increased, while the depth of the splines 16 and 17 can be reduced, giving an overall improvement to the robustness of the clutch friction wheel.

In a modified embodiment not shown, a resilient ring is inserted between the retaining ring 27 and the spacing ring 40, which enables the resilient ring 23' of the predamper device 24, together with at least that one of the friction rings 22' which is directly biassed by the ring 23', to be omitted. The axial clearance on the other side of the damper plate 12' is then absent.

In another embodiment not shown, the retaining ring 27 is integral with the hub 14, being formed by upsetting the material of the latter.

The present invention is of course not limited to the various embodiments described above, but embraces all practical variations in, and/or combinations of, their various elements. In particular, the pins 36 may, instead of being secured to the guide rings 18' by an upsetting operation, be integral with these guide rings. In addition, the structures may be inverted, so that the support ring 13 carries projections—which may be of frustoconical shape—which engage in complementary holes formed in the guide rings 18'. In all cases, both fitting and removal of the predamper device 24 is easy.

What is claimed is:

1. A clutch friction wheel comprising: a hub and a support ring, together defining loose coupling means whereby the support ring is mounted on the hub for limited relative rotation with respect to the hub; a damper plate carried on the support ring for rotation with respect to the support ring; abutment means carried by the support ring for limiting the rotation of the damper plate with respect to the support ring; a friction disc secured to the damper plate; a pair of guide rings secured to the support ring and arranged respectively on either side of the damper plate; a damping device operatively disposed between the damper plate and the guide rings; and a predamper device operatively arranged between the support ring and the hub, wherein, in combination: firstly, the friction disc, damper plate, guide rings, support ring and damping device together define a first sub-assembly in which the guide rings are secured directly to the support ring through their inner perimeter; secondly, the predamper device and the hub together define a second sub-assembly in which the predamper device is disposed on a first side of the guide rings, the second sub-assembly further including means defining a retaining abutment element disposed axially on the hub on second side of said guide rings opposite said first side with respect to said damper plate; and thirdly, the clutch friction wheel further includes a mating rotary coupling directly coupling the predamper device and the support ring at a position radially inside the innermost portion of said guide rings.

2. A clutch friction wheel according to claim 1, wherein the support ring defines a securing surface and the inner perimeter of each guide ring defines a corresponding surface portion, the friction wheel further including a weld joining the said securing surface and surface portion together so as to secure the guide rings to the support ring.

3. A clutch friction wheel according to claim 2, wherein the said weld is circumferentially endless.

4. A clutch friction wheel according to claim 2, wherein at least one of the elements comprising the support ring and the guide rings comprises a flange means for securing the guide rings to the support ring.

5. A clutch friction wheel according to claim 4, wherein the said mating coupling defines a first circumference having a first diameter, the flange means for securing the guide rings to the support ring defining a second circumference having a second diameter greater than the said first diameter.

6. A clutch friction wheel according to claim 1, wherein the predamper device abuts the support ring.

7. A clutch friction wheel according to claim 6 defining an axis of rotation, wherein the support ring defines at least one recess, the said mating coupling comprising a corresponding number of pins carried by the predamper device and extending parallel to the axis of the assembly, each pin being engaged in a corresponding said recess.

8. A clutch friction wheel according to claim 1, wherein the said abutment means comprise at least one bar parallel with the axis of the assembly and carried without clearance by the guide rings, with the at least one bar passing through the damper plate with a clearance, the at least one bar being secured on the guide rings before the guide rings are secured to the support ring.

9. A clutch friction wheel according to claim 1, further including a resilient ring defining the said retaining abutment element, said hub having a radial slot for receiving said ring, and further including a spacing ring associated with the hub for rotation with the hub and arranged between the retaining ring and the support ring.

10. A clutch friction wheel according to claim 1, wherein the said inner perimeter of each guide ring extends at right angles to the axis of the assembly.

* * * * *